Figure 1:
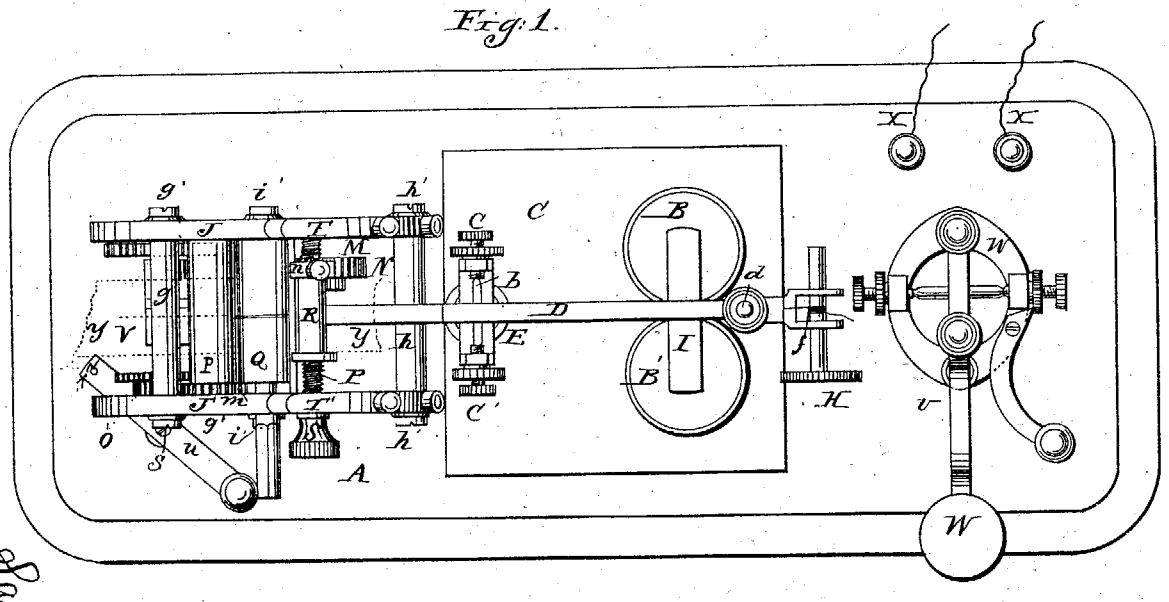

2 Sheets—Sheet 1.

S. F. DAY.

ELECTROMAGNETIC TELEGRAPH.

No. 3,335. Reissued Mar. 23, 1869.

WITNESSES:

Chas E Hore

James F. Graham

INVENTOR:

Saml F. Day

By Thos J. Crow

Atty

2 Sheets—Sheet 2.
S. F. DAY.
ELECTROMAGNETIC TELEGRAPH.
No. 3,335. Reissued Mar. 23, 1869.
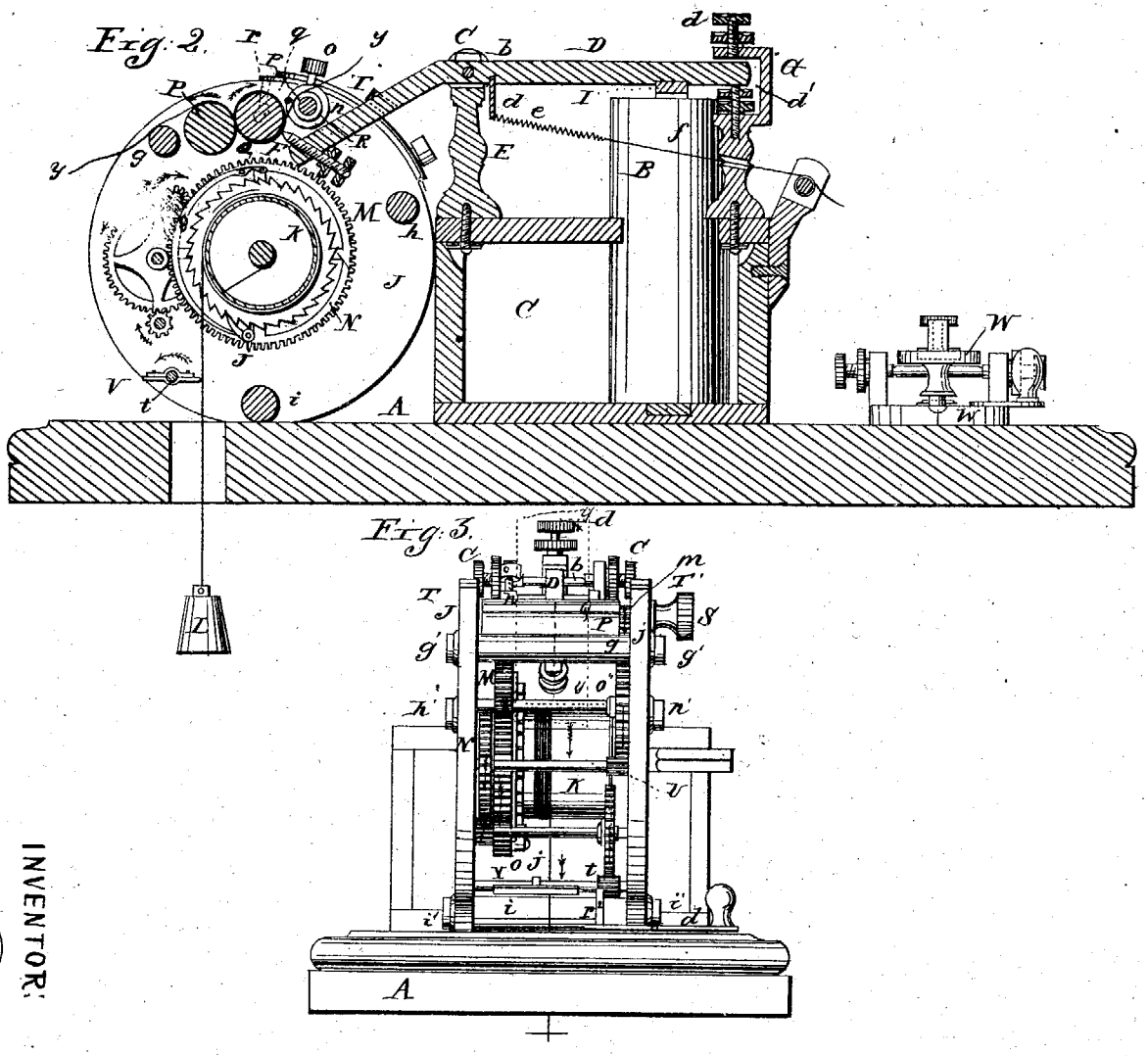
WITNESSES:
Chas. E. Hope
James T. Graham
INVENTOR:
Saml. F. Day
By Thos. J. Cow
Atty

UNITED STATES PATENT OFFICE.

SAMUEL F. DAY, OF BALLSTON SPA, NEW YORK.

IMPROVEMENT IN ELECTRO-MAGNETIC TELEGRAPHS.

Specification forming part of Letters Patent No. 42,842, dated May 24, 1864; Reissue No. 3,335, dated March 23, 1869.

*To all whom it may concern:*

Be it known that I, SAMUEL F. DAY, of Ballston Spa, in the county of Saratoga and State of New York, have invented a certain Improvement in Magnetic Telegraphs; and I do hereby declare the following to be a full, clear, and exact description thereof, reference being had to the accompanying drawings, and to the letters of reference marked thereon, forming a part of this specification, in which—

Figure 1 is a plan or top view of an indenting registering-machine. Fig. 2 is a vertical longitudinal section through the same. Fig. 3 is an end view taken on the left of Fig. 1.

This invention relates to a certain improvement in Morse's electro-magnetic telegraph, which dispenses with the use of local batteries and relays at the several stations on the line; and it consists, in part, in the adaptation to and combination of an indenting-register with the main line.

Said invention also consists in the arrangement, in combination with the other parts of the instrument, of a sounding-box in the manner hereinafter set forth, by which the audibility of the sound produced by the blow of the registering-lever is very much increased, thus enabling the operator to catch the sounds with much greater facility, in case he desires to read a message by sound.

A is the base or stand to which the several parts of the machine are connected.

B B′ are two electro-magnets, placed in a vertical position and surrounded by a sounding-box, C.

D is a lever, with a pin or arm, *a*, projecting downward from its under side. This lever is attached to an arbor, *b*, and is centered between two thumb-screws, *c c′*, which terminate in a standard, E. An adjustable thumb-screw with a steel point, F, is attached to that portion of the lever D which is represented as being bent downward in the drawings. The opposite end of the lever terminates between a standard, G, provided with suitable thumb-screws, *d d′*, for adjusting said lever according to the strength of battery on the main line.

It will be observed that the lever D is hung on the standard E at about two-thirds its length, taken from the right-hand end of said lever.

A spiral spring, *e*, is made to fasten on the arm or pin *a* of the lever D, the tension of which is regulated by a thumb-screw, H, around the shaft of which a fine cord, *f*, is wound, said cord passing through the center of the standard G and connecting with the spiral spring *e*.

The object of the spiral spring *e* is to withdraw the armature I from the electro-magnets B B′ when the circuit is broken.

This apparatus is provided with clock-work machinery for the purpose of feeding the paper continuously, similar to other telegraph-machines. It consists of two circular plates, J J′, which form the sides inclosing the interior mechanism. These plates J J′ are secured together by three bolts, *g h i*, and heads *g′ h′ i′*.

K is a barrel, around which the cord suspending the weight L is wound. To this barrel K is attached a ratchet-wheel, M.

N is a spur-wheel situated just behind the ratchet-wheel M.

O is a metal spring, which presses against a pawl, *j*, both of which are fastened to the spur-wheel N.

The weight L sets in motion the spur-wheel N and pinion *k*. This communicates motion to the spur-wheel O′ and pinions *l* and *m*. The pinion *m* is attached to a roller, P, which roller presses against another roller, Q. Both of these rollers are milled or slightly grooved on their surfaces, so as to prevent the paper from slipping while passing between them.

R is a guide through which the paper *y y* (shown in red lines) passes. This guide is provided with an arrangement consisting of a ring and thumb-screw, *o*, for the purpose of adjusting it to the width of the paper to be used. This guide is adjusted by a screw, *p*, which terminates in a thumb-head, S. The axis of the roller Q rests in a slot, *q*, in each of the plates J J′. In these slots are placed two metal pins, *r r′*, which are kept close up against the axis of the said roller by the metal springs T T. The object of this arrangement is to keep the paper pressed tight between the rollers Q R.

The arrows in the drawings indicate the directions in which the several spur wheels and pinions revolve.

A device for stopping the machinery at any desired moment is shown at *u*.

$r^3$ is an upright projection on the metal strip U, which metal strip works on the screw *s*.

When it is desired to stop the machinery the handle of the strip U is pushed out in the direction indicated by the red lines until it (the rod $r^2$) strikes against a revolving fan or metal strip, V, fastened to the shaft *t*. This causes the machinery to stop instantly.

The operation and construction of the key W are the same as in Morse's instrument, and therefore need no description.

It will be seen by the drawings that the armature I is represented as being down on the electro-magnets B B′, or, in other words, the circuit is closed.

*x x′* are the two screw-cups to which the line-wire is attached.

The operation is briefly as follows: The current passes along the wire from the screw-cup *x′* to and around the coils of the electro-magnets B B′, along a wire to the insulated button *v*. Another wire connects with the screw-cup *x* and the metallic portion *w* of the key W. When the key is pressed down so as to strike the insulated button *v* the circuit is closed and the armature I is attracted to the magnets B B′, thus forcing the steel point F into the paper *y y* and producing the required strokes or dots. It is necessary to the success of this instrument, in a main-line current, that the fulcrum of the lever should be as near the end which carries the point for indenting the paper as is possible, without bringing it so close as to prevent sufficient range, so as to enable the electro-magnets to exert a greater leverage.

By placing the fulcrum of the lever at the point above stated I double the effective power of the instrument, or nearly so; but this improvement alone is insufficient to accomplish the result sought successfully. In addition to, and in combination with, this change I employ a material change in the magnets used. Instead of making them of No. 22 wire, and of a weight of from four to eight ounces of wire, I use No. 32 wire and increase the weight of this portion of the magnets to about twenty ounces, or from that to two pounds, of wire. I also increase the length of the cores to about three inches and their diameter to three-eighths or one-half of an inch.

By constructing my apparatus in this manner I am enabled to work an indenting registering-instrument in a main-line circuit of any ordinary length without the intervention or aid of a local battery, and by this means I entirely avoid the expense and trouble of the latter. This might perhaps be done by the change in the construction of the magnet without changing the lever from an equal beam; but I prefer to construct the lever in the manner described, as it very materially aids in the accomplishment of the result.

The combination, with a registering-instrument, of a magnet constructed as I have described enables the line-current to operate upon the instrument with great intensity, and this intensity well supplies the place of the volume derived from the local battery by which it is now customary to work such instruments.

The object of the improvement being to work an indenting registering-instrument by the power of the main-line current, it is obvious that the nature and gist of the invention consists in giving to the parts such a construction as to cause this current to act upon the instrument with sufficient intensity to properly indent the paper for ordinary business purposes, on a line of ordinary or equivalent construction and length, in such a manner as to be available for the ordinary purposes of telegraphing, and that the line of distinction between this invention and the old form and manner of construction is found in the adaptation of the instrument to the successful accomplishment of this purpose, of which it was before incapable.

It will also be observed that the fulcrum-post E and the sounding-post G are set upon the top of the box C, instead of being attached directly to the bed-plate of the machine, as in the construction now in common use.

The object of this improvement is to make the sound produced by the blow of the lever more audible, which result it accomplishes in a very satisfactory manner, thus enabling the operator, if qualified, to read by sound, if desirable, under circumstances in which it would otherwise be difficult if not impossible.

It will be observed that the sounding-post or part upon which the blow is struck is so attached to the sounding-box C, and the other parts are so arranged in connection with it, that the blow is struck directly toward the box in such a manner as to produce vibration thereof by direct action—that is to say, a tangential line drawn from the arc in which the armature vibrates at the point at which the blow is given would intersect the box, making the action of the blow direct in producing the vibration and consequent sound. It is only in this way that the full effect of the blow in producing the sound for reading the message can be realized.

I am aware that an instrument has before been constructed in which the coils have been placed longitudinally above a similar box, and the blow struck in a line parallel to the top of the box and passing outside of and above said box; but this does not accomplish the purpose of my invention, as the action of the blow is not and cannot be direct, but is only incidental, and does not have that effect in developing sound from the box which a direct blow would have.

I claim—

1. Combining with an indenting telegraphic registering-instrument a magnet constructed according to the proportions described in the foregoing specification, or substantially so, so as to accomplish the result stated by means substantially the same—that is to say, so as to give sufficiency of intensity and power of action to produce uniformly-legible indentations in the paper in an ordinary line-current without the aid of a local battery, as hereinabove set forth.

2. The arrangement of the sounding-box C, the lever D, and the sounding-post G of a magnetic-telegraph in combination with each other, in the manner hereinbefore described, and to the effect stated.

SAML. F. DAY.

Witnesses:
DAVID MAXWELL,
P. W. BARTHOLOMEW.